United States Patent
Balogh

(10) Patent No.: US 7,719,243 B1
(45) Date of Patent: May 18, 2010

(54) SOFT-START SYSTEM AND METHOD FOR POWER CONVERTER

(75) Inventor: Laszlo Balogh, Merrimack, NH (US)

(73) Assignee: Fairchild Semiconductor Corporation, South Portland, ME (US)

( * ) Notice: Subject to any disclaimer, the term of this patent is extended or adjusted under 35 U.S.C. 154(b) by 342 days.

(21) Appl. No.: 11/986,579

(22) Filed: Nov. 21, 2007

(51) Int. Cl.
G05F 1/40 (2006.01)
H03F 1/52 (2006.01)

(52) U.S. Cl. .................. 323/281; 330/298; 323/280

(58) Field of Classification Search ......... 323/312–316, 323/273–277, 280, 281; 330/271, 293, 297, 330/298
See application file for complete search history.

(56) References Cited

U.S. PATENT DOCUMENTS

| | | |
|---|---|---|
| 3,491,252 A | 1/1970 | Petrohilos |
| 3,555,399 A | 1/1971 | Buchanan et al. |
| 3,840,797 A | 10/1974 | Aggen et al. |
| 3,916,224 A | 10/1975 | Daniels et al. |
| 4,072,965 A | 2/1978 | Kondo |
| 4,143,282 A | 3/1979 | Berard, Jr. et al. |
| 4,228,493 A | 10/1980 | de Sarte et al. |
| 4,236,198 A | 11/1980 | Ohsawa et al. |
| 4,367,437 A * | 1/1983 | Mikami .............. 323/349 |
| 4,495,554 A | 1/1985 | Simi et al. |
| 4,559,590 A | 12/1985 | Davidson |
| 4,622,627 A | 11/1986 | Rodriguez et al. |
| 4,695,936 A | 9/1987 | Whittle |
| 4,706,176 A | 11/1987 | Kettschau |
| 4,706,177 A | 11/1987 | Josephson |
| 4,720,641 A | 1/1988 | Faini |
| 4,725,769 A | 2/1988 | Cini et al. |
| 4,734,839 A | 3/1988 | Barthold |
| 4,739,462 A | 4/1988 | Farnsworth et al. |
| 4,806,844 A | 2/1989 | Claydon et al. |
| 4,809,148 A | 2/1989 | Barn |
| 4,811,184 A | 3/1989 | Koninsky et al. |

(Continued)

FOREIGN PATENT DOCUMENTS

EP 0 651 440 A1 5/1995

(Continued)

OTHER PUBLICATIONS

R. Brucker, et al., "Optimizing Converter Design and Performance Utilizing Micro Controller System Feedback and Control," Proceedings of Powercon 8, E-2, pp. 1-10, 1981.

(Continued)

Primary Examiner—Jessica Han
(74) Attorney, Agent, or Firm—Sidley Austin LLP

(57) ABSTRACT

In one embodiment, a method for soft-start in a power converter includes the following: providing a feedback signal indicative of the output voltage of the power system at a first input terminal of an error amplifier in a negative feedback loop of the power converter; providing a reference voltage at a second input terminal of the error amplifier; comparing the feedback signal against the reference voltage to generate a control signal for regulating an output voltage of the power converter; charging a soft-start capacitor coupled to the second input terminal of the error amplifier with a current for establishing the reference voltage; and adjusting the current in response to the control signal so that the error amplifier is prevented from saturation.

19 Claims, 1 Drawing Sheet

U.S. PATENT DOCUMENTS

| | | |
|---|---|---|
| 4,814,674 A | 3/1989 | Hrassky |
| 4,858,094 A | 8/1989 | Barlage |
| 4,862,339 A | 8/1989 | Inou et al. |
| 4,866,590 A | 9/1989 | Odaka et al. |
| 4,870,555 A | 9/1989 | White |
| 4,887,199 A | 12/1989 | Whittle |
| 4,888,497 A | 12/1989 | Dallabora et al. |
| 4,890,210 A | 12/1989 | Myers |
| 4,928,220 A | 5/1990 | White |
| 4,937,728 A | 6/1990 | Leonardi |
| 4,943,903 A | 7/1990 | Cardwell, Jr. |
| 4,943,907 A | 7/1990 | Godwin |
| 5,012,401 A | 4/1991 | Barlage |
| 5,014,178 A | 5/1991 | Balakrishnan |
| 5,021,937 A | 6/1991 | Cohen |
| 5,034,871 A | 7/1991 | Okamoto et al. |
| 5,041,956 A | 8/1991 | Marinus |
| 5,072,353 A | 12/1991 | Feldtkeller |
| 5,086,364 A | 2/1992 | Leipold et al. |
| 5,146,394 A | 9/1992 | Ishii et al. |
| 5,161,098 A | 11/1992 | Balakrishnan |
| 5,177,408 A | 1/1993 | Marques |
| 5,200,886 A | 4/1993 | Schwartz et al. |
| 5,245,526 A | 9/1993 | Balakrishnan et al. |
| 5,297,014 A | 3/1994 | Saito et al. |
| 5,313,381 A | 5/1994 | Balakrishnan |
| 5,394,017 A | 2/1995 | Catano et al. |
| 5,452,195 A | 9/1995 | Lehr et al. |
| 5,461,303 A | 10/1995 | Leman et al. |
| 5,481,178 A | 1/1996 | Wilcox et al. |
| 5,508,602 A | 4/1996 | Borgato et al. |
| 5,528,131 A | 6/1996 | Marty et al. |
| 5,552,746 A | 9/1996 | Danstrom |
| 5,563,534 A | 10/1996 | Rossi et al. |
| 5,568,084 A | 10/1996 | McClure et al. |
| 5,570,057 A | 10/1996 | Palara |
| 5,572,156 A | 11/1996 | Diazzi et al. |
| 5,617,016 A | 4/1997 | Borghi et al. |
| 5,619,403 A | 4/1997 | Ishikawa et al. |
| 5,621,629 A | 4/1997 | Hemminger et al. |
| 5,640,317 A | 6/1997 | Lei |
| 6,459,247 B1 * | 10/2002 | Benes .................. 323/281 |
| 6,922,474 B2 * | 7/2005 | Hayama ................ 381/94.5 |
| 7,190,934 B2 * | 3/2007 | Kataoka et al. ......... 455/126 |
| 2007/0090818 A1 * | 4/2007 | Nishimori ............. 323/282 |

FOREIGN PATENT DOCUMENTS

| | | |
|---|---|---|
| EP | 0 694 966 A1 | 1/1996 |
| EP | 0 736 957 A1 | 10/1996 |
| EP | 0 740 491 A1 | 10/1996 |
| EP | 0 748 034 A1 | 12/1996 |
| EP | 0 748 035 A1 | 12/1996 |
| EP | 0 751 621 A1 | 1/1997 |
| WO | WO 83/01157 | 3/1983 |

OTHER PUBLICATIONS

A.J. Bowen, et al., Power Supply with Optical Isolator, IBM Technical Disclosure Bulletin, vol. 14, No. 11, pp. 3320, Apr. 1972.

A. Halperin, "Primary Regulated Dual Power Supply," IBM Technical Disclosure Bulletin, vol. 21, No. 10, pp. 4299-4300, Mar. 1979.

H.S. Hoffman, Jr., et al., "Proportional Drive Supply with Diversion Control," IBM Technical Disclosure Bulletin, vol. 21, No. 12, pp. 4904-4905, May 1979.

D. Azzis, et al., "Flyback on Card Power Supply," IBM Technical Disclosure Bulletin, vol. 23, No. 4, pp. 1477-1478, Sep. 1980.

B. Pelly, et al., "Power MOSFETs Take the Load Off Switching Supply Design," Electronic Design, pp. 135-139, Feb. 1983.

"5-W DC-DC Converters Aim at Telecomm Applications," Electronic Design, vol. 31, No. 15, p. 227, Aug. 1985.

"Combined Switch-Mode Power Amplifier and Supply," IBM Technical Disclosure Bulletin, vol. 28, No. 3, pp. 1193-1195, Aug. 1985.

"Off-Line Power Supply Control Technique Using a Single Transformer to Back Three Control Signals," IBM Technical Disclosure Bulletin, vol. 32, No. 8A, Jan. 1990, pp. 272-273, Jan. 1990.

H.S. Hoffman, Jr., "Self-Generated Bias Supply," IBM Technical Disclosure Bulletin, vol. 20, No. 5, pp. 1814-1815, Oct. 1997.

* cited by examiner

SOFT-START SYSTEM AND METHOD FOR POWER CONVERTER

BACKGROUND

1. Field of Invention

The present invention relates to power conversion, and more particularly, to a soft start system and method for a power converter.

2. Description of Related Art

Power converters are essential for many modern electronic devices. Among other capabilities, a power converter can adjust voltage level downward (buck converter and its derivatives) or adjust voltage level upward (boost converter and its derivatives). A power converter may also convert from alternating current (AC) power to direct current (DC) power, or vice versa. A power converter may also function to provide an output at a regulated level (e.g., 5.0V). Power converters are typically implemented using one or more switching devices, such as transistors, which are turned on and off to deliver power to the output of the converter. Control circuitry is provided to regulate the turning on and off of the switching devices, and thus, these converters are known as "switching regulators" or "switching converters." Such a power converter may be incorporated into or used to implement a power supply—i.e., a switching mode power supply (SMPS). The power converters may also include one or more capacitors or inductors for alternately storing and outputting energy Some power converters may employ a soft-start circuit in order to begin operation after power on. One kind of soft-start circuit can be a closed-loop soft-start which maintains an error amplifier of the power converter in its linear operating mode to actively control the output voltage of the power converter to follow a reference voltage $V_{REF}$ at the non-inverting input of the error amplifier. The power converter is able to follow the reference voltage $V_{REF}$ until the error amplifier output is saturated—i.e. its output is not limited by the supply rails of the error amplifier.

Typically, during start up, the reference voltage $V_{REF}$ at the non-inverting input of the error amplifier rises with a predetermined speed, $dV_{REF}/dt$. That speed is calculated during initial circuit design and based on the following factors: (1) the value of the soft start capacitor ($C_{SS}$) coupled to the non-inverting input of the error amplifier; and (2) the value of a soft start resistor ($R_{SS}$) or the amplitude of an $I_{SS}$ dc current source coupled to the soft start capacitor for charging the same.

The rise time of the reference voltage $dV_{REF}/dt$ at the non-inverting input of the error amplifier determines how quickly the output capacitor $C_{OUT}$ is charged from an initial condition of 0V to its final value, where the output voltage $V_{OUT}$ can be regulated by the power converter. The rise time of the output voltage $dV_{OUT}/dt$ is proportional to the rise time of the reference voltage $dV_{REF}/dt$.

To support this rate of rise $dV_{OUT}/dt$ at the output during soft start, the power converter must deliver the sum of two current components. The first current component charges the output capacitor and is a function of the value of the output capacitor and rate of rise at the output ($C_{OUT}*dV_{OUT}/dt$). The second current component provides power to the load ($I_{LOAD}$). The total output current ($I_{OUT}$) delivered by the power converter then is:

$$I_{OUT} = C_{OUT} \cdot \frac{dV_{OUT}}{dt} + I_{LOAD}$$

The equation above shows that during soft start, the output current $I_{OUT}$ depends not only on the $dV_{REF}/dt$ value calculated by the designer but also the converter's output capacitance $C_{OUT}$ and the actual load during soft start. Furthermore, the output capacitance $C_{OUT}$ might have a significant tolerance and its value can be easily multiplied by additional capacitance added by the end user of the power supply. In addition, a power supply is typically required to reliably start up with any load. All these effects will greatly influence the required output current $I_{OUT}$ during start up.

A problem arises if the above-calculated output current $I_{OUT}$ exceeds the maximum output current of the power converter. When this happens, the power converter can no longer operate in a closed-loop operating mode. In particular, the maximum output current is usually established by a current limit circuit and is slightly higher than the specified maximum load current $I_{LOAD}$. When the current of the power converter exceeds the maximum output current limit, the error amplifier goes into saturation and looses control over the output voltage $V_{OUT}$, such that the output voltage $V_{OUT}$ does not follow the reference voltage $V_{REF}$ as it should. Ultimately, when the output voltage $V_{OUT}$ reaches its final value, the error amplifier will need to recover from its saturated state. During this recovery, the output voltage $V_{OUT}$ overshoots, which is an undesired phenomenon in power supplies.

SUMMARY

According to an embodiment of the present invention, a system is provided for soft-start in a power converter. The system includes an error amplifier having a first input terminal and a second input terminal. The error amplifier receives a feedback signal indicative of the output voltage of the power system at the first input terminal, and receives a reference voltage at the second input terminal. The error amplifier is operable to compare the feedback signal against the reference voltage to generate a control signal for regulating an output voltage of the power converter. A soft-start capacitor, coupled to the second input terminal of the error amplifier, is operable to be charged for establishing the reference voltage. An adjustable current source is operable to provide a current to charge the soft-start capacitor for establishing the reference voltage. The adjustable current source receives the control signal from the error amplifier, and adjusts the current in response to the control signal so that the error amplifier is prevented from saturation.

According to another embodiment of the present invention, a method for soft-start in a power converter includes the following: providing a feedback signal indicative of the output voltage of the power system at a first input terminal of an error amplifier in a negative feedback loop of the power converter; providing a reference voltage at a second input terminal of the error amplifier; comparing the feedback signal against the reference voltage to generate a control signal for regulating an output voltage of the power converter; charging a soft-start capacitor coupled to the second input terminal of the error amplifier with a current for establishing the reference voltage; and adjusting the current in response to the control signal so that the error amplifier is prevented from saturation.

According to yet another embodiment of the present invention, a system is provided for soft-start in a power converter.

The system includes an error amplifier in a negative feedback loop of the power converter, the error amplifier having a first input terminal and a second input terminal. The error amplifier receives a feedback signal indicative of the output voltage of the power system at the first input terminal, and receives a reference voltage at the second input terminal. The error amplifier is operable to compare the feedback signal against the reference voltage to generate a control signal for regulating an output voltage of the power converter. A reference voltage adjustment circuitry, coupled to the second input terminal of the error amplifier, is operable to adjust the reference voltage in response to the control signal so that the error amplifier is prevented from saturation.

Important technical advantages of the present invention are readily apparent to one skilled in the art from the following figures, descriptions, and claims

BRIEF DESCRIPTION OF DRAWINGS

For a more complete understanding of the present invention and for further features and advantages, reference is now made to the following description taken in conjunction with the accompanying drawings.

DETAILED DESCRIPTION

Figure 1:
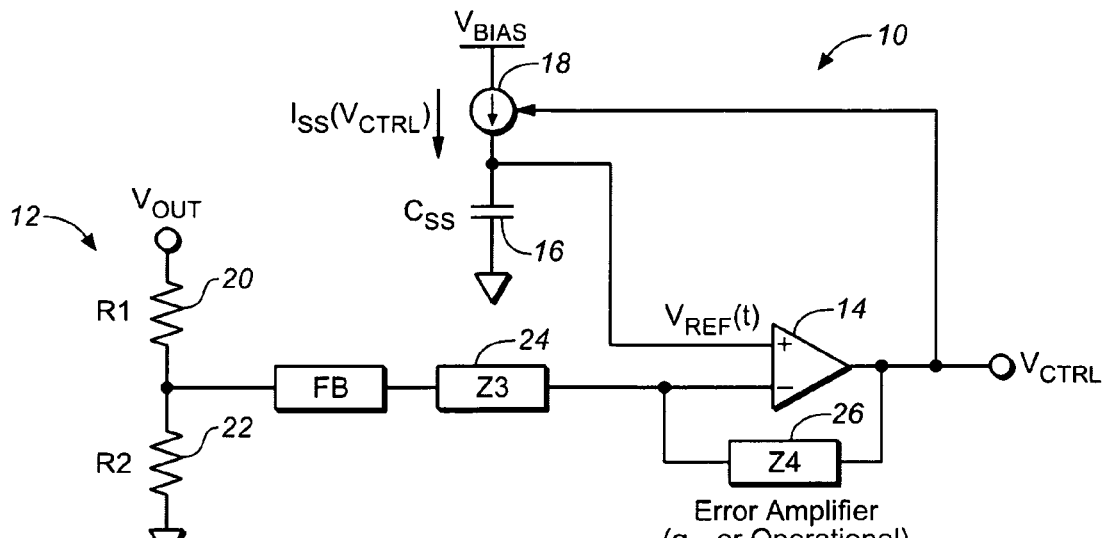
FIG. 1 is a block diagram of an exemplary implementation of a closed loop start-up system, according to an embodiment of the invention.
Figure 2:
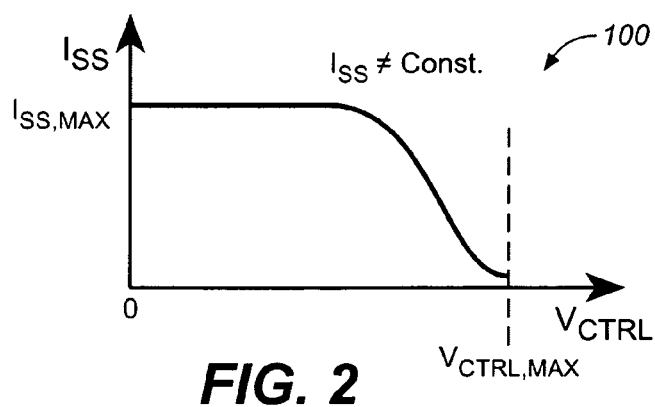
FIG. 2 is an exemplary diagram illustrating the value of a soft-start current as a function of the output of an error amplifier, according to an embodiment of the invention.
Figure 3:
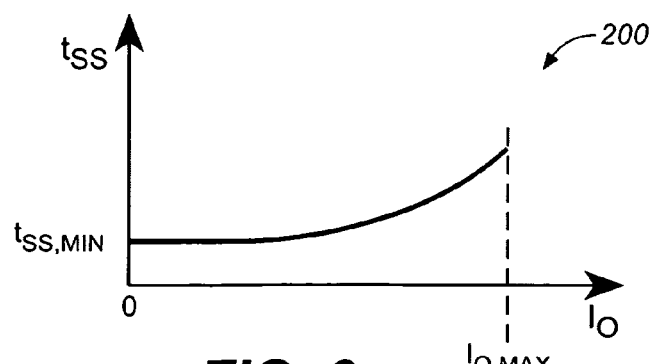
FIG. 3 is an exemplary diagram illustrating minimum soft-start time as a function of the total output current of a power converter, according to an embodiment of the invention.

Embodiments of the present invention and their advantages are best understood by referring to FIGS. 1 through 3 of the drawings. Like numerals are used for like and corresponding parts of the various drawings.

In various embodiments, the present invention prevents overshoot by maintaining or keeping the control loop closed during soft start. In some embodiments, the present invention prevents saturation of the error amplifier in the control loop of a power converter during soft start (i.e., the error amplifier stays in its linear operating range). This technique can be implemented using analog or digital circuit design techniques.

FIG. 1 is a block diagram of an exemplary implementation of a closed-loop start-up system 10, according to an embodiment of the invention. Such start-up system 10 can be used with or incorporated in a power converter, such as a switching regulator which provides a regulated output voltage $V_{OUT}$ (e.g., 5V). Start-up system 10 provides a relatively fast, load-independent soft-start for the power converter. As shown, start-up system 10 includes resistor network 12, an error amplifier 14, a soft-start capacitor (Css) 16, and an adjustable current source (Iss) 18.

The resistor network 12 comprises resistor 20 and 22 coupled in series, for example, between output voltage $V_{OUT}$ for the power converter and ground (GND). As used herein, the terms "coupled" or "connected," or any variant thereof, covers any coupling or connection, either direct or indirect, between two or more elements. Resistor network 12 may function as a output voltage feedback divider. That is, resistor network 12 divides the value of the output voltage $V_{OUT}$ and provides it as feedback at a terminal or pin FB.

The error amplifier 14 has an inverting (−) terminal and a non-inverting (+) terminal. The inverting (−) terminal of error amplifier 14 is coupled to the resistor network 12 through an impedance 24 (Z3) to receive the feedback signal. The non-inverting (+) terminal receives a reference voltage $V_{REF}(t)$, the value of which can vary with time. The error amplifier 14 compares the feedback signal against the reference voltage $V_{REF}(t)$, and in response, outputs a control signal $V_{CTRL}$. The control signal $V_{CTRL}$ may be provided for controlling switching for regulating output voltage of the power converter. The output of the error amplifier is coupled to its inverting (−) terminal through an impedance 26 (Z4).

Soft-start capacitor 16 and adjustable current source 18 are coupled to the non-inverting (+) terminal of error amplifier 14 and function to generate or develop the reference voltage $V_{REF}(t)$. Reference voltage $V_{REF}(t)$, which varies with time, corresponds to the voltage of the soft-start capacitor 16. Adjustable current source 18 provides a current Iss for charging the soft-start capacitor 16. As soft-start capacitor 16 is charged, the value of the reference voltage $V_{REF}(t)$ increases. Adjustable current source 18 is coupled to and receives the control signal $V_{CTRL}$ output from the error amplifier 14. The magnitude of current $I_{SS}$ output from adjustable current source 18 is controlled by the control signal $V_{CTRL}$ and can be adjusted between a minimum and maximum value.

The output current $I_{OUT}$ of the power converter, in which start-up system 10 is incorporated, is proportional to the control voltage signal $V_{CTRL}$ output from the error amplifier 14. As the output current $I_{OUT}$ approaches its maximum value where current limit operation would commence, control voltage $V_{CTRL}$ also approaches its maximum voltage (saturation). If the current demand of the power converter's load exceeds the current capability of the converter, the error amplifier 14 would saturate. With start-up system 10, however, the error amplifier 14 controls the soft-start current source 18. This arrangement can reduce the current needed to charge the output capacitor. As a result, the saturation of the error amplifier 14 can be prevented and the control loop can stay in its linear operating range. Thus, closed loop soft-start is maintained.

To accomplish this, in one embodiment, the soft-start current $I_{SS}$ (output from adjustable current source 18 for charging the soft-start capacitor 16) is reduced when the output of the error amplifier 14 (control signal $V_{CTRL}$) rises and nears the saturation voltage. Start-up system 10 moves to equilibrium as the reduced Iss current slows down the rising rate of the output voltage ($dV_{OUT}/dt$), thus reducing the total output current ($I_{OUT}$) demand of the power converter.

In an alternative embodiment, an adjustable voltage source can be used instead of the adjustable current source 18. Such adjustable voltage source would also be responsive to the control signal $V_{CTRL}$, output from the error amplifier 14.

In various embodiments, all or a portion of the start-up system 10 shown in FIG. 1 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals therebetween. In one embodiment, for example, error amplifier 14, soft-start capacitor 16, and adjustable current source 18 can be provided on a single chip or die, or on one or more separate die, and resistors 20 and 22 of resistor network 12 are implemented as discrete components.

FIG. 2 is an exemplary diagram 100 illustrating the value of soft-start current Iss as a function of the output of error amplifier 14, according to an embodiment of the invention. Soft-start current $I_{SS}$ is output from adjustable current source 18, which is controlled by the control voltage $V_{CTRL}$ from error amplifier 14. As such, the value of soft-start current $I_{SS}$ varies with control voltage $V_{CTRL}$. The magnitude of soft-start current $I_{SS}$ is at its highest (e.g., $I_{SS\_MAX}$) when the control voltage $V_{CTRL}$ from error amplifier 14 is low. As the value of the control voltage $V_{CTRL}$ rises, the magnitude of soft-start current $I_{SS}$ decreases.

FIG. 3 is an exemplary diagram 200 illustrating soft-start time ($t_{SS}$) as a function of the total output current $I_{OUT}$ of a power converter with the start-up system 10, according to an embodiment of the invention. The soft-start time $t_{SS}$ varies with the output current $I_{OUT}$. The soft-start time $t_{SS}$ is at its lowest (e.g., $t_{SS\_MIN}$) when the output current $I_{OUT}$ is low. As the magnitude of the output current $I_{OUT}$ rises, the soft-start time $t_{SS}$ increases. The soft-start time $t_{SS}$ is at its highest when the output current $I_{OUT}$ is at its maximum.

Thus, in various embodiments, the present invention provides an advantage in that it prevents or keeps the error amplifier 14 from saturation.

Another advantage of the present invention, in some embodiments, is that it allows faster start-up with light load. In particular, with previously developed techniques, the soft start time is designed for worst case conditions, which results in extremely long soft-start time to ensure closed-loop operation when the circuit starts up under full load conditions.

Yet another advantage is that the present invention facilitates design for soft start circuitry. The start-up system 10 is transparent for the designer, and the control of the soft start current Iss is automatically adjusted by the output of the error amplifier 14.

Still yet another advantage is that the present invention, in various embodiments, is insensitivity to tolerances for the output capacitor and load current variations of a power converter.

Another advantage, in some embodiments, is that the present invention can significantly reduce or substantially eliminate overshoot of the output voltage $V_{OUT}$ of the power converter during start up. This is especially important in power factor correction (PFC) applications but can also relevant in low voltage applications where there is little tolerance for overshoot.

Embodiments of the present invention, such as start-up system 10, can be used in any closed-loop start-up system. Furthermore, embodiments of the present invention can be used in a wide variety of power converter topologies including, for example, isolated or non-isolated applications, buck converters, boost converters, buck/boost converters, flyback converters, SEPIC converters, etc. Embodiments of the present invention may be used with a variety of control methods including, for example, analog control, digital control, voltage-mode control, current-mode control, average current-mode control, etc.

For example, in alternative embodiment, the exemplary analog circuit of FIG. 1 can be replaced by its digital equivalent circuit. In such a digital implementation, the voltage signals (such as the voltage across the soft-start capacitor 16, output voltage of the error amplifier 14, and the scaled output voltage provided by the resistive network having resistors 20 and 22) are represented by numerical quantities. In one embodiment for a digital implementation, the reference (Vref (t)) to the error amplifier 14 is a numerical value between zero and the final value of said reference representing the desired output voltage of the converter. In a digital implementation, the error amplifier 14 can be implemented with a digital compensator. Furthermore, the output voltage of the converter or system can also represented by its numerical equivalent after an analog-to-digital conversion, which can be obtained by directly converting the output voltage to a digital quantity or by converting only the error between the actual and desired output voltage of the converter to a digital quantity. In such an implementation, soft-start can be provided by incrementing the numerical value of the reference from zero to its final value. Increments to the numerical reference number can be made in predetermined time intervals to achieve the desired output voltage ramp up time. For a digital implementation, the time interval between the increments to the numerical value of the reference may also be responsive to the control signal from output of the digital compensator (the equivalent of error amplifier 14).

Furthermore, in addition to a pure analog or pure digital implementations, analog and digital circuits can be combined in various manners to achieve the desired functionality covered by the spirit of the invention.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A system for soft-start in a power converter comprising:
an error amplifier having a first input terminal and a second input terminal, the error amplifier receiving a feedback signal indicative of the output voltage of the power system at the first input terminal, the error amplifier receiving a reference voltage at the second input terminal, the error amplifier operable to compare the feedback signal against the reference voltage to generate a control signal for regulating an output voltage of the power converter;
a soft-start capacitor coupled to the second input terminal of the error amplifier and operable to be charged for establishing the reference voltage; and
an adjustable current source operable to provide a current to charge the soft-start capacitor for establishing the reference voltage, the adjustable current source receiving the control signal from the error amplifier, the adjustable current source adjusting the current in response to the control signal so that the error amplifier is prevented from saturation.

2. The system of claim 1 wherein the error amplifier is in a negative feedback loop of the power converter.

3. The system of claim 1 wherein the first input terminal of the error amplifier is an inverting terminal and the second input terminal of the error amplifier is a non-inverting terminal.

4. The system of claim 1 comprising a resistor network coupled to the output voltage of the power system.

5. The system of claim 4 wherein the resistor network develops the feedback signal indicative of the output voltage of the power system.

6. The system of claim 1 wherein at least part of the system is implemented on an integrated circuit.

7. The system of claim 1 wherein the magnitude of the current is higher at the beginning of start up and decreases over time.

8. A method for soft-start in a power converter comprising:
providing a feedback signal indicative of the output voltage of the power system at a first input terminal of an error amplifier in a negative feedback loop of the power converter;
providing a reference voltage at a second input terminal of the error amplifier;
comparing the feedback signal against the reference voltage to generate a control signal for regulating an output voltage of the power converter;
charging a soft-start capacitor coupled to the second input terminal of the error amplifier with a current for establishing the reference voltage; and
adjusting the current in response to the control signal so that the error amplifier is prevented from saturation.

9. The method of claim 8 wherein the first input terminal of the error amplifier is an inverting terminal and the second input terminal of the error amplifier is a non-inverting terminal.

10. The method of claim 8 comprising developing the feedback signal indicative of the output voltage of the power system with a resistor network coupled to the output voltage of the power system.

11. The method of claim 8 wherein the magnitude of the current is higher at the beginning of start up and decreases over time.

12. A system for soft-start in a power converter comprising:
an error amplifier in a negative feedback loop of the power converter, the error amplifier having a first input terminal and a second input terminal, the error amplifier receiving a feedback signal indicative of the output voltage of the power system at the first input terminal, the error amplifier receiving a reference voltage at the second input terminal, the error amplifier operable to compare the feedback signal against the reference voltage to generate a control signal for regulating an output voltage of the power converter; and
reference voltage adjustment circuitry coupled to the second input terminal of the error amplifier and operable to adjust the reference voltage in response to the control signal so that the error amplifier is prevented from saturation.

13. The system of claim 12 wherein the reference voltage adjustment circuitry comprises a soft-start capacitor coupled to the second input terminal of the error amplifier and operable to be charged for establishing the reference voltage.

14. The system of claim 12 wherein the reference voltage adjustment circuitry comprises an adjustable current source operable to provide a current to charge the soft-start capacitor for establishing the reference voltage.

15. The system of claim 12 wherein the reference voltage adjustment circuitry comprises an adjustable voltage source operable to provide a voltage for use in developing a current to charge the soft-start capacitor for establishing the reference voltage.

16. The system of claim 12 wherein the first input terminal of the error amplifier is an inverting terminal and the second input terminal of the error amplifier is a non-inverting terminal.

17. The system of claim 12 comprising a resistor network coupled to the output voltage of the power system.

18. The system of claim 12 wherein the resistor network develops the feedback signal indicative of the output voltage of the power system.

19. The system of claim 12 wherein at least part of the system is implemented on an integrated circuit.

\* \* \* \* \*